(No Model.)
J. HOPSON, Jr.
THERMOMETER.
No. 406,139. Patented July 2, 1889.
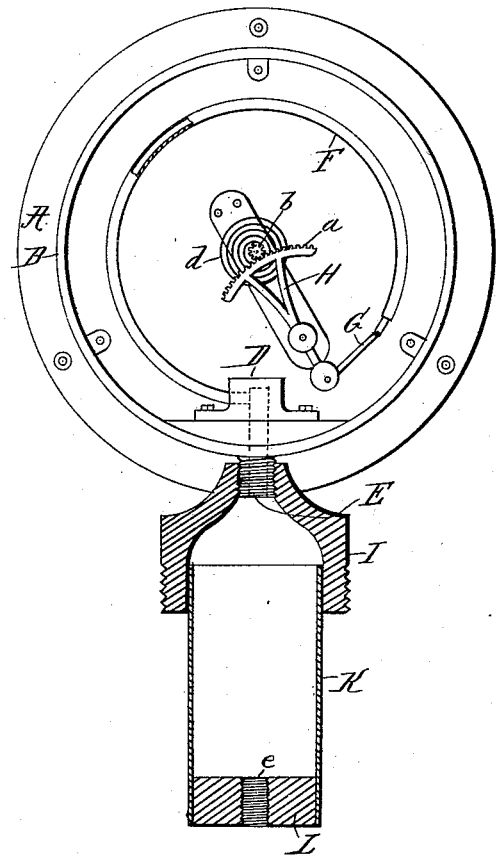
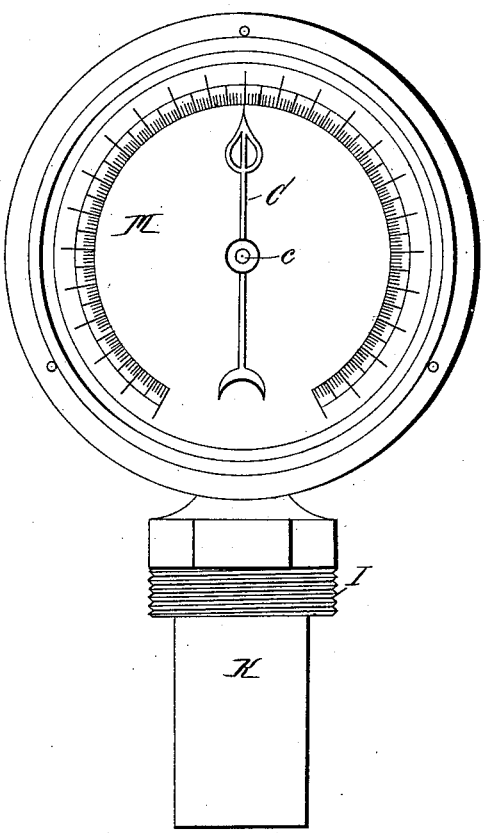
Witnesses:
John Buckler,
L. H. Osgood,
Inventor:
John Hopson, Jr.
By Worth Osgood,
Attorney.

UNITED STATES PATENT OFFICE.

JOHN HOPSON, JR., OF NEW LONDON, CONNECTICUT.

THERMOMETER.

SPECIFICATION forming part of Letters Patent No. 406,139, dated July 2, 1889.

Application filed July 16, 1888. Serial No. 280,143. (No model.)

*To all whom it may concern:*

Be it known that I, JOHN HOPSON, Jr., of New London, county of New London, and State of Connecticut, have invented certain new and useful Improvements in Thermometers, of which the following is a full, clear, and exact description, reference being had to the accompanying drawings, and to the letters of reference marked thereon.

My invention relates to instruments of which one of the chief purposes is to indicate or measure temperatures, and therefore may be classed among thermometers.

Among the objects of my invention are the production of a simple, durable, and reliable instrument which may be employed to indicate varying temperatures of liquids or fluids confined (as under pressure) or free, and this by utilizing the expansive or contractive force (or both) of an easily-volatile medium inclosed so as to be entirely unaffected by any pressure of the material of which the temperature is to be gaged, and to secure other and further advantages in the matters of construction and operation, as will hereinafter appear. To accomplish all of this my improvements involve certain new and useful arrangements or combinations of parts and principles of operation, as will be first fully explained, and then pointed out in the claims.

In the accompanying drawings, forming part of this specification, Figure 1 is a view of my improved apparatus, partly in elevation and partly in section, the view being taken from the rear and omitting the back plate or cover. Fig. 2 is a front elevation showing a dial and pointer, of which the latter is moved over the former as the temperature rises or falls.

In both figures like letters of reference, wherever they occur, indicate corresponding parts.

A is a plate, upon the back of which is a rim or flange B, forming a recess for containing the mechanism connected with a pointer, as C. This mechanism is intended to include a flattened and curved tube, such as are commonly used in steam-gages. Of these there are a variety of patterns mounted and connected in various ways differing in detail rather than in principle of operation. I have shown one of the simplest forms as best calculated for the illustration of my invention.

D represents a stationary block, within which is a port or passage establishing communication between a nipple E and the interior of a flattened curved tube F and serving as a support for the fixed end of said tube. The free end of tube F is connected by a link G to a pivoted arm H, carrying a rack $a$, which engages a pinion $b$ upon the shaft $c$ of pointer C. A light coiled spring, as $d$, connected with shaft $c$, is usually employed to maintain the pointer in proper position to be accurately, instantly, and easily moved as tube F varies in curvature.

It is well understood that pressure within tube F tends to straighten it or decrease its curvature, the movement of the free end being transmitted to the pointer through the intervening mechanism. When operated by pressure alone, the gage is called a "pressure-gage." Diminution of pressure within tube F below the normal will increase the curvature or cause the free end, and therefore the pointer, to move in the opposite direction, and when so operated the gage is called a "vacuum-gage."

When the one instrument is intended to be used both as a pressure and a vacuum gage, it is called a "compound gage," and my improved device includes either or all of these styles.

I is a nut securely applied upon the nipple E, receiving a shell K, of which the lower end may be closed in any suitable way, as by a plug L, having a small orifice, as $e$. The joints are preferably soldered or brazed to make them perfectly secure against leakage. The exterior of nut I is threaded, so that the shell K may be entered through any suitable fitting, and thus surrounded by or project into the liquid or fluid of which the temperature is to be measured or indicated.

I charge the instrument with any suitable volatile liquid, such as alcohol, ether, naphtha, &c., according to the uses to which the instrument may be intended to be applied. The liquid, whatever it is, is introduced through aperture $e$, which is afterward securely closed by a threaded or other plug, or by a suitable cap soldered or brazed in place. If it be desired to exclude air, and it is recommended for the better class of instruments, and especially if low temperatures be required to be measured, the instrument is reversed and shaken until the tube F is filled, when the shank K may be heated, vaporizing a sufficient quantity of the liquid therein, the vapor driving out the air before it. The operation may be facilitated by burning the vapor as it escapes. When enough has escaped the shell is sealed and the instrument is ready for use.

The wall of the cylinder or shank K is made thin, so that its contents will be quickly affected by changes of temperature, and it is made much larger in diameter than the Bourdon tube that the instrument may be conveniently filled with an expansible fluid and be then plugged and sealed, the air having been expelled. For this purpose a tube or leg of about the size of the Bourdon tube is insufficient, and I consequently provide the enlarged cylinder K, as represented.

As the temperature of any medium in contact with the exterior of shell K rises the contents of the shell are expanded, producing movements of the pointer over the dial M, which is preferably graduated according to either of the standards of temperature. If the temperature of the contracting medium falls below a determined degree the contents of the shell are contracted, causing the pointer to move in the opposite direction. Thus it will be seen that the pointer is moved by the expansive or contractive force of the sealed medium, and yet the instrument is entirely unaffected by the pressure or any other condition of the surrounding medium, save only its temperature.

The improved device is especially applicable in measuring the temperature of water under pressure, as in feed-water heaters for boilers, in hot-water heating apparatus, in boilers and tanks generally, for measuring steam-temperatures, for indicating degrees of cold produced in cooling or refrigerating apparatus, brine-tanks, and so on in connection with innumerable apparatus employing either liquids or fluids.

While it is preferred to make the dial so that the temperatures will be indicated directly thereon, it is apparent that it might be marked to indicate degrees of pressure of the sealed contents of the instrument, the temperatures being deducible from the indicated pressures.

Heretofore a Bourdon tube has been used in connection with a hollow tube or leg intended to be inserted in a vessel or chamber to indicate its temperature, and I do not broadly claim such device, but only the particular construction hereinafter pointed out. My device, while aiming at a similar result and acting upon the same general principles as prior devices, effects its object with equal or greater efficiency by a simpler and more economical construction. Thus, for example, I dispense with the interior leg and the complex coupling exhibited in Patent No. 301,397, and also provide an instrument which can be more readily filled with an expanding-fluid to the exclusion of air, and which can be more directly connected with a vessel whose temperature is to be indicated.

Having now fully described my invention, what I claim as new, and desire to secure by Letters Patent, is—

1. In a thermometer, the Bourdon tube, the large externally-screw-threaded nut, the cylinder fitted to the interior of the externally-screw-threaded end of the nut, provided with a plug having an opening adapted to be sealed, substantially as specified.

2. In a thermometer, the combination of the tube, block, nipple, and externally-screw-threaded nut with a vessel having a correspondingly-threaded opening and with the enlarged cylinder having at its outer end a plug provided with a filling-orifice adapted to be sealed, all as set forth, whereby the instrument can be conveniently filled and plugged and sealed after the expulsion of air and then connected directly to the vessel.

In testimony that I claim the foregoing I have hereunto set my hand in the presence of two witnesses.

JOHN HOPSON, Jr.

Witnesses:
WILLIAM BELCHER,
WM. J. DE MAURIAC.